United States Patent [19]
Parson et al.

[11] Patent Number: 4,885,740
[45] Date of Patent: Dec. 5, 1989

[54] DIGITAL SIGNAL SWITCH

[75] Inventors: Brian J. Parson; Roger M. Shepherd; Michael D. May; Graham Stewart, all of Bristol, United Kingdom

[73] Assignee: Inmos Limited, Bristol, United Kingdom

[21] Appl. No.: 145,217

[22] Filed: Jan. 19, 1988

[30] Foreign Application Priority Data

Jan. 19, 1987 [GB] United Kingdom ................. 8701009

[51] Int. Cl.$^4$ ............................................ H04Q 11/04
[52] U.S. Cl. ...................................... 370/60; 370/94.2; 371/33
[58] Field of Search ...................... 370/60, 94, 85, 940; 371/32, 33

[56] References Cited

U.S. PATENT DOCUMENTS

| 4,074,232 | 2/1978 | Otomo et al. | 370/94 V |
| 4,312,065 | 1/1982 | Vlug | 370/94 V |
| 4,527,267 | 7/1985 | Cohen | 370/60 |

Primary Examiner—Robert L. Griffin
Assistant Examiner—Wellington Chin
Attorney, Agent, or Firm—Edward D. Manzo

[57] ABSTRACT

A digital switch for selectively interconnecting a plurality of devices, including microcomputers, in a network comprises a plurality of inputs, a plurality of outputs and selectively operable interconnections which include decoding means for decoding data and acknowledgement bit packets, clock means, and means for generating under control of clock signals output bit packets having bit signals corresponding to bits of input bit packets.

19 Claims, 5 Drawing Sheets

DIGITAL SIGNAL SWITCH

The invention relates to a digital signal switch and particularly to a signal switch for effecting a plurality of selectable interconnections between devices which may communicate with each other in an interconnect network.

BACKGROUND OF THE INVENTION

The invention is particularly, but not exclusively, applicable to networks of intercommunicating microcomputers or microcomputers with other devices. It is particularly applicable to the communication between pairs of devices which transmit data packets consisting of a serial bit packet of a first format along a unidirectional communication line between the two devices and acknowledgement packets formed by a serial bit packet of a second format which is transmitted along a further unidirectional communication line between the two devices. Such communicating systems are described in the specifications of U.S. patent applications Ser. Nos. 553,027 (now 938,380) and 756,992. The disclosures of those two specifications are incorporated herein by cross-reference to those application numbers. In those communication systems, each pair of communicating devices are coupled by two separate unidirectional communication lines. One device which wishes to output data to the other sends a data packet along one communication line, the data packet having a fixed serial bit length commencing with a start bit and having a first format characteristic of a data packet. When that data packet is received by an inputting device, the inputting device causes an acknowledgement packet to be sent along the other of the pair of communicating lines between the devices. The acknowledgement packet also has a fixed serial bit length commencing with a start bit and a second format characteristic of an acknowledgement packet. Each data packet must be followed by an acknowledgement packet before a further data packet can be output.

The above mentioned specifications illustrate networks of interconnected microcomputers and other devices wherein the network has a format determined by the pairs of communicating lines between the devices in the network.

It is an object of the present invention to provide a digital signal switch which may be used for effecting a plurality of selectable interconnections between devices which communicate with each other by serial bit packets of two types. By use of such a digital signal switch, it is possible to provide different configurations of connections between the devices in the network.

The network structure can in this way be configured to perform a particular task. The switch can be used to construct reconfigurable networks of arbitrary size. In a preferred embodiment, the switch may be provided with a communication interface of the type described in European Published Specification No. 0141659 so that the configuration of the switch may be programmed by use of a microcomputer or other device connected to the interface.

SUMMARY OF THE INVENTION

The present invention provides a digital signal switch for effecting a plurality of selectable interconnections between devices which communicate with each other by serial bit packets of two types, a first type being a data packet of a first format commencing with a start bit and a second type being an acknowledgement packet of a second format commencing with a start bit, said switch having a plurality of inputs, a plurality of outputs, and connecting circuitry for selectively interconnecting said inputs and outputs. The connecting circuitry includes a start bit detector for detecting a start bit of a serial bit packet which is input to the switch. Preferably, it also includes a decoder for determining whether the packet is of the first or second type. A clock provides timing signals to the switch. Also, the connecting circuitry includes circuitry for receiving each bit of an input bit packet which is received at an input and under control of the clock and generates as an output an output bit packet having bit signals corresponding to the bits of the input bit packet.

Preferably the circuitry for receiving each bit of an input bit packet comprises a buffer for holding a plurality of bits.

Preferably the buffer has a bit capacity to hold at least one bit packet of said first type, whereby small differences in bit frequency between input bit packets and output bit packets may be accommodated without loss of data in the switch. In one example, the buffer has a bit capacity of at least ten bits.

Preferably the connecting circuitry further comprises a plurality of signal paths between the plurality of inputs and outputs, each path having a selector with a latch to determine which input/output pair is to be connected through that selector.

Preferably each signal path further comprises synchronizing means for sampling input signals at a frequency higher than the bit frequency of the input signal. It detects a leading edge of a start bit of a packet and supplies a synchronized signal after a controlled time interval from detection of said leading edge. this provides a true indication of the bit pattern in an input packet regardless of any phase difference between the clock and the phase of input packet signals.

In one embodiment each signal path includes a first in first out buffer having an input counter for clocking data into the buffer and an output counter for clocking data out of said buffer. Preferably said input counter is arranged to receive clock signals from said synchronizing means.

Preferably a communication interface is provided to enable communication between said switch and a controlling device, such as a microcomputer, said communication interface being connected to said connecting circuitry in order to set a desired configuration for the switch interconnections. In one embodiment said communication interface comprises an output channel for outputting data and an input channel for receiving data. The output channel comprises (a) an output terminal for connection to an external unidirectional communication line so as to transmit data bits serially along the line, and (b) a packet generator means arranged to generate and supply to the output terminal serial bit packets. These serial bit packets are data packets of a first format for conveying data and acknowledgement packets of a second format to indicate receipt of a data packet. The input channel comprises (c) an input terminal for connection to an external unidirectional communication line so as to receive data bits serially along the line, and (d) a packet decoder for receiving serial bit packets from said input terminal and detecting whether the packet is of the first format or of the second format. The communication interface also includes a control circuit connected to said packet generator and said packet decoder and responsive to the output of a packet by the output channel or receipt of a packet by the input channel to cause the packet generator to output an acknowledgement packet in response to receipt of the data packet by the input channel and after output of a data packet to prevent output of a further data packet until the input channel has received an acknowledgement packet.

The invention also provides a network of interconnected digital devices including a plurality of microcomputers, said devices being interconnected by at least one switch device and arranged to communicate with each other by serial bit packets of two types, a first type being a data packet of a first format commencing with a start bit and a second type being an acknowledgement packet of a second format commencing with a start bit, said switch having a plurality of inputs, a plurality of outputs, and connecting circuitry for selectively interconnecting said inputs and outputs, said connecting circuitry having bit detecting circuitry for detecting a start bit of a serial bit packet which is input to the switch, decoding circuitry for determining whether the packet is of the first or second type, a clock providing timing signals, and a circuit for receiving each bit of an input bit packet which is received at an input and under control of said clock generating as an output an output bit packet having bit signals corresponding to the bits of the input bit packet.

Preferably each device is connected to a said switch device by a communication interface which comprises an output channel for outputting data and an input channel for receiving data, the output channel comprising (a) an output terminal for connection to an external unidirectional communication line so as to transmit data bits serially along the line, and (b) a packet generator means arranged to generate and supply to the output terminal serial bit packets comprising data packets of a first format for conveying data and acknowledgement packets of a second format to indicate receipt of a data packet, said input channel comprising (c) an input terminal for connection to an external unidirectional communication line so as to receive data bits serially along the line, and (d) a packet decoder means for receiving serial bit packets from said input terminal and detecting whether the packet is of the first format or of the second format. The interface also includes a control circuit connected to the packet generator and the packet decoder and responsive to the output of a packet by the output channel or receipt of a packet by the input channel to cause the packet, generator means to output an acknowledgement packet in response to receipt of the data packet by the input channel and after output of a data packet to prevent output of a further data packet until the input channel has received an acknowledge packet.

Preferably each switch device includes a buffer for holding a plurality of signal bits received by the switch, the buffer having a bit capacity to hold at least one bit packet of said first type.

The configuration of the network may be determined by one or more such switch devices.

The invention in another aspect further includes a method of configuring interconnection of a plurality of digital devices, including a plurality of microcomputers, in a network. This method comprises connecting a communication interface on each device to a switch device, setting a selected pattern of switch connections between a plurality of inputs and outputs on the switch device, and receiving messages at one or more inputs of the switch device. Each message comprises a serial bit packet of two alternative types, a first type being a data packet of a first format commencing with a start bit and a second type being an acknowledgement of a second format commencing with a start bit. The method also includes detecting a start bit of a serial bit packet which is input to the switch, decoding the packet to determine whether the packet is of the first or second type, and generating output bit packets corresponding to the bit packets which are received at the switch inputs.

The method may include sampling input signals at each input of a switch device at a frequency higher than the bit frequency of the input signal in order to detect a leading edge of a start bit of a packet and supplying a synchronized signal after a controlled time interval from detection of said leading edge in order to provide an indication of the bit pattern in an input packet.

The method may include setting a plurality of interconnections within the switch device by communication of signals from a communication interface on a microcomputer with a connected communication interface on said switch device.

DESCRIPTION OF THE PREFERRED EMBODIMENTS

Figure 1:
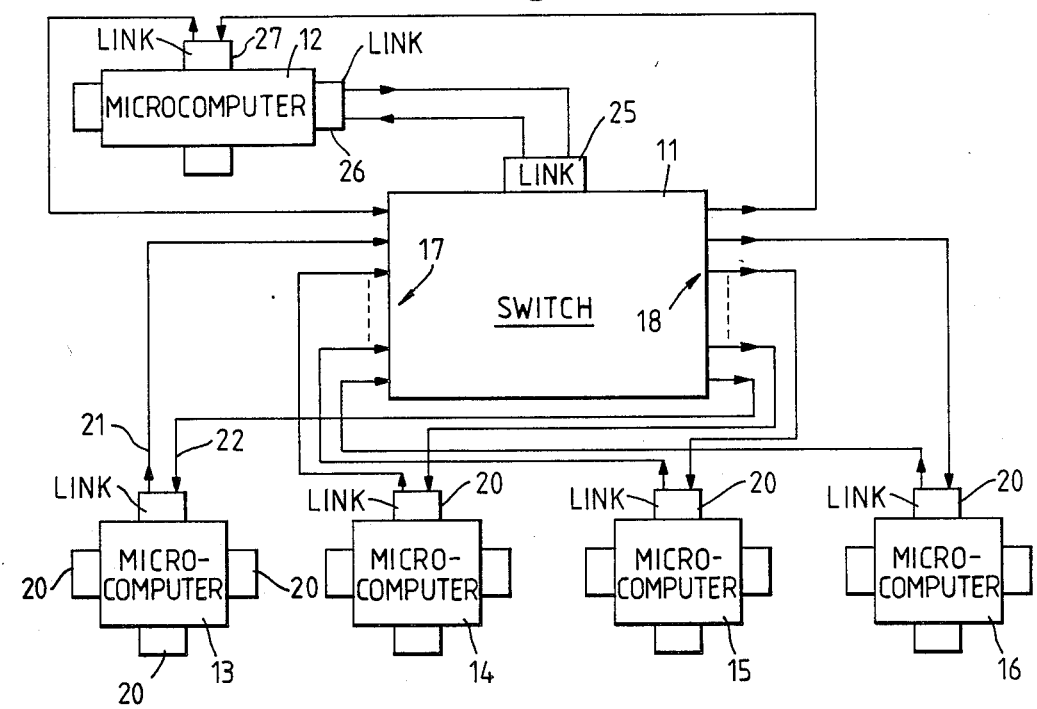
FIG. 1 is a block diagram of a digital signal switch controlled by one microcomputer and providing selected interconnections between input and output lines on a plurality of other microcomputers.

In the arrangement shown in FIG. 1, a digital signal switch 11 has a configuration controlled by a microcomputer 12 and provides a programmed configuration of interconnections between the microcomputer 12 and four other microcomputers 13, 14, 15 and 16. The switch has a plurality of inputs 17 and an equal number of outputs 18. Each of the microcomputers shown is in this example of the type described in our U.S. patent application Ser. No. 553,027 referred to above. Each includes a plurality of serial links 20 to permit external communication. Each serial link has two unidirectional non-shared signal lines one forming an output 21 and the other forming an input 22. Each of the serial links 20 is arranged to communicate with serial strings of data bits in the form of data packets of a first format and acknowledgement packets of a second format. Each packet is of a predetermined bit length and starts with a start bit. As is shown in FIG. 1, the output line of each link 20 on the microcomputers 13 to 16 is connected to a respective one of the inputs 17 on the switch 11. Similarly outputs of the switch 18 are connected to respective input lines 22 of the appropriate link 20 of the microcomputers 13 to 16. The switch 11 has a similar serial link 25 which provides a communication interface of the type described in our U.S. patent application Ser. No. 756,992. This is connected to link 26 of the controlling microcomputer 12. The microcomputer 12 has further links one of which is marked 27 and is connected to respective input 17 and output 18 of the switch 11 so that the microcomputer 12 can also communicate with any of the other microcomputers in the network. In the particular example shown the switch is arranged to have 32 inputs and 32 outputs. However other numbers may be provided.

Figure 2:
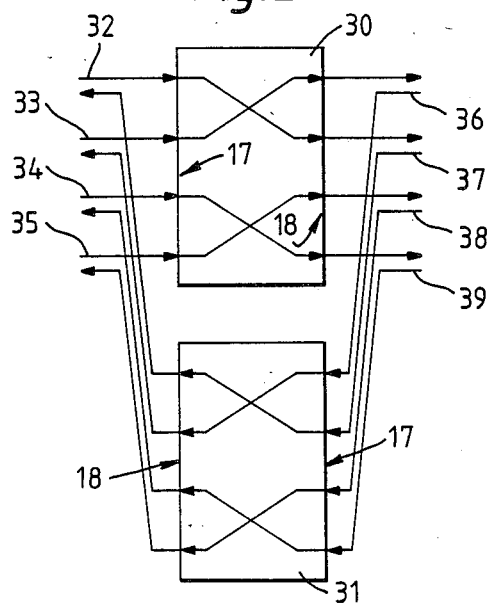
FIG. 2 illustrates the interconnection of four pairs of communicating lines by use of two simple digital switch devices.

For example, in FIG. 2 two simple switch units 30 and 31 are shown each having four inputs 17 and four outputs 18. Switch 30 is illustrated as providing selectable configuration of interconnections between four signal lines 32, 33, 34 and 35 which are arranged to communicate data from left to right. The similar switch 31 is arranged to provide selectable interconnections between the four corresponding signal lines 36, 37, 38 and 39 which transmit data from right to left and form pairs of signal lines with lines 32 to 35. Each of the switches 30 and 31 may be programmed to form any desired arrangement of interconnections between the four inputs to the switch and the four outputs from the switch. As the lines which are interconnected by these switches form pairs each associated with a line 20 the switching is arranged to provide corresponding interconnections for each pair of lines. As can be seen from FIG. 2, line 32 is arranged to form a pair with line 37 and similarly for the other pairs of lines illustrated.

As will be described below, each switch is arranged to avoid degradation of the digital signals transmitted by these switches so that switches may be arranged in series connection as well as parallel arrangements. In the example shown in FIG. 3 three similar digital switches 40, 41 and 42 are used. In this way a number of smaller switches can be connected together to implement a larger switch. In this particular example three inputs 43 are fed to switch 40, and three inputs 44 are fed to switch 41. Each of switches 40 and 41 is arranged to provide a direct output 45 whereas the other outputs 46 are fed to the series connected switch 42 which in turn provides four further outputs 47. It will be appreciated that in this example the three switches shown are arranged to connect single signal lines transmitting data from left to right. They do form part of pairs of signal lines. The remaining lines of the pairs which will transmit data from right to left have not been shown and they will be similarly connected through three switch units such as those indicated at 40, 41 and 42.

Figure 5:
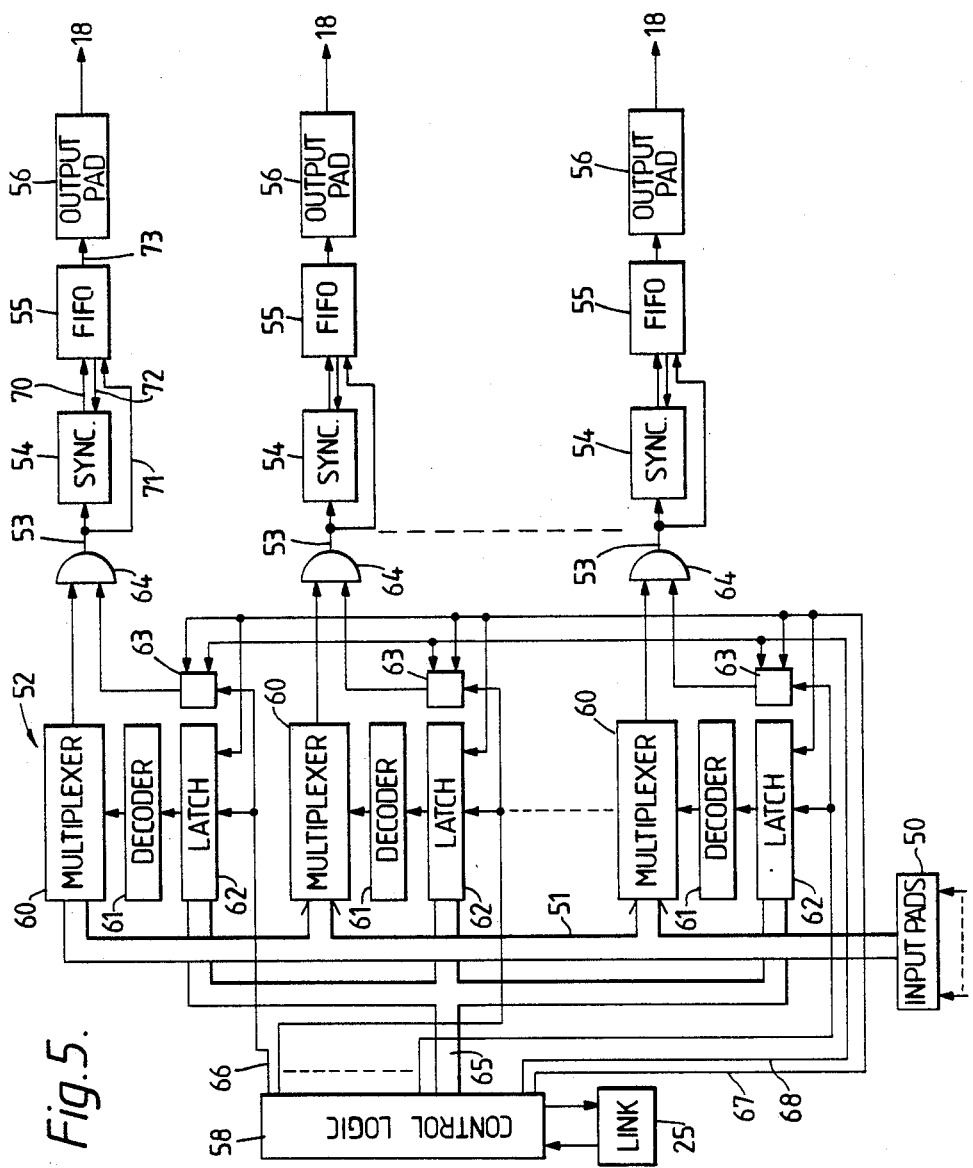
FIG. 5 illustrates further details of the switch illustrated in FIG. 4, and FIGS. 6 and 7 illustrate further details of parts of the switch shown in FIG. 5.
Figure 6:
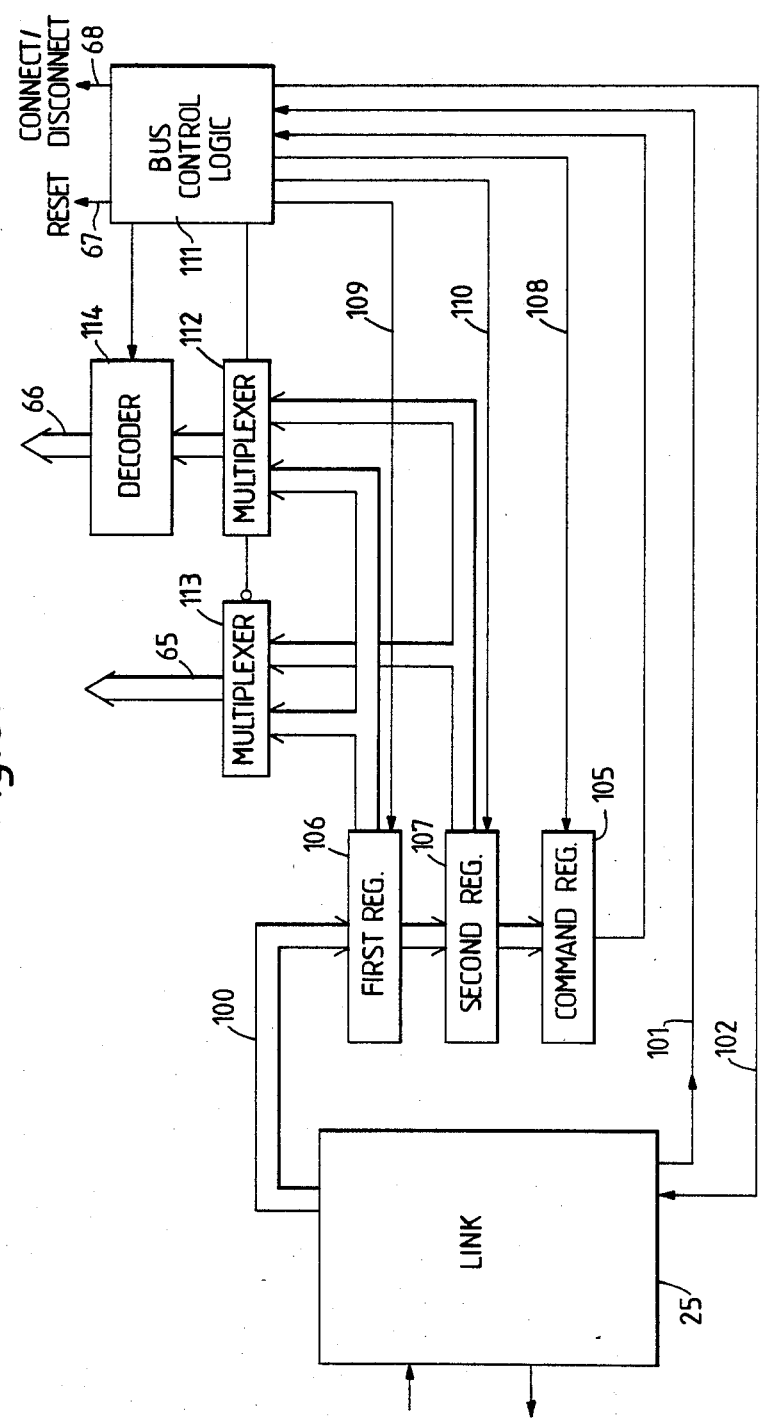

The construction of any one switch unit will now be described in more detail with reference to FIGS. 4 to 6. This switch unit is similar to that shown in FIG. 1 and has 32 inputs 17 and 32 outputs 18. This provides the possibility of 32 parallel paths through the switch thereby permitting the selected interconnection of 16 pairs of communication lines. Input signals are connected to a plurality of input pads 50 connected by a 32 bit bus 51 to a plurality of cross point switches 52 which comprise a plurality of multiplexors for respective signal paths thereby selecting which of the input lines on the bus 51 will be connected to specific output lines 53. Each of the separate output lines 53 forms a discrete signal path each having its own synchronizer 54, first in first out buffer 55 and output pad 56 thereby providing the possible 32 outputs 18. A switch clock 57 is arranged to provide timing signals to the synchronizers 54 and to the buffers 55 as well as to control logic 58. The link 25 through which the configuration signals are supplied to the switch is connected to control logic 58 which in turn controls the cross point switches 52.

The switch construction will be further described with reference to FIG. 5. Each signal path connected to a respective output path has a switch element 52 formed by a multiplexor 60, decoder 61, latch 62, connect latch 63 and an AND gate 64. Each switch element 52 is similarly formed and each signal path has a similar switch element although only three signal paths have been illustrated in FIG. 5.

Input packets are fed on any of 32 input lines along the bus 51 which is connected to each of the multiplexors 60 so that the multiplexor may select any one of the data lines in the bus 51 for connection to its output 18. In order to select which of the input lines in the bus 51 is selected by the multiplexor, each multiplexor has a 5 bit latch 62 which may hold a signal derived from a 5 bit bus 65 forming an output from the control logic 58. The control logic 58 also outputs 32 enable signal lines 66 which are connected to respective latches 62 and connect latches 63. The control logic 58 also provides a reset output signal 67 and a connect/disconnect signal on line 68. Both lines 67 and 68 are connected to each of the connect latches 63. In order to determine which output 18 will be connected to which input 17, the control logic 58 selects a particular output by providing an enable signal on one of the lines 66 and a connect signal on line 68. The selection of the enable signal line 66 chooses which output is now to be used and the enable signal causes the associated latch 62 to be loaded with a value to determine which input is to be selected. The associated connect latch 63 simultaneously receives the enable signal. This causes the latch 63 to be set from the connect signal on line 68 so that it provides a signal to the AND gate 64 enabling the output to the associated output 18 of any signal passing through the multiplexor 60. The control logic 58 outputs on bus 65 a 5 bit signal representing the input which is to be connected to the selected output. This 5 bit signal is fed to all latches 62 but only the latch 62 which receives an enable signal on line 66 is loaded with that data. Once the latch 62 is loaded the associated decoder 61 operates the multiplexor 60 to connect selectively the required one of the 32 input lines in bus 51 to the corresponding output 18.

As has been described in the above mentioned U.S. Patent Specifications, the serial bit packets are of two types having different format but each starting with a start bit. A data packet consists of two successive 1 bits followed by 8 data bits and then a stop bit of 0. An acknowledgement packet consists solely of 2 bits 1 followed by 0. Once the multiplexors 60 have been set by the control logic 58 to give the required configuration of interconnections, data may be passed from the input pads 50 to the output pads 56 each signal channel transmitting a succession of data packets or acknowledgement packets or a mixture of both depending on the signals which are to be conveyed by the microcomputers which have been interconnected through the switch. The signal packets which arrive at the input pads 50 have a bit frequency determined by a controlling clock on the microcomputer or other device which is connected to the corresponding input pad 50. Similarly, data will be removed from the output pads 56 to further microcomputers or devices which will be operating under the control of their own time clock.

Figure 3:
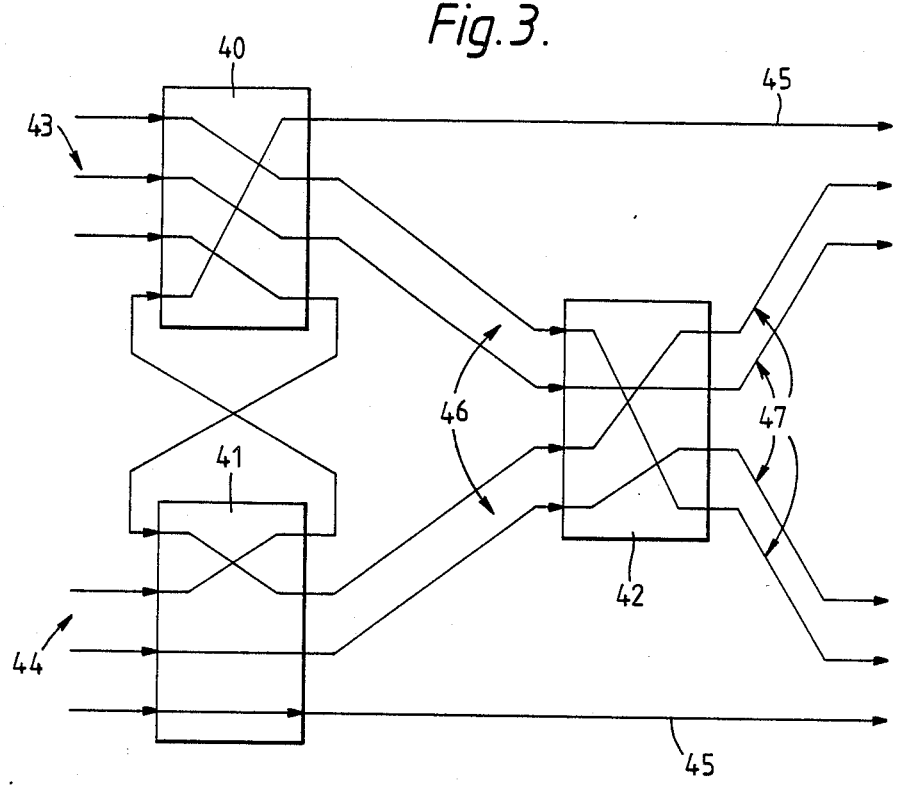
FIG. 3 illustrates the interconnection between six pairs of communicating lines by use of three simple digital switch devices connected in serial arrangement.
Figure 4:
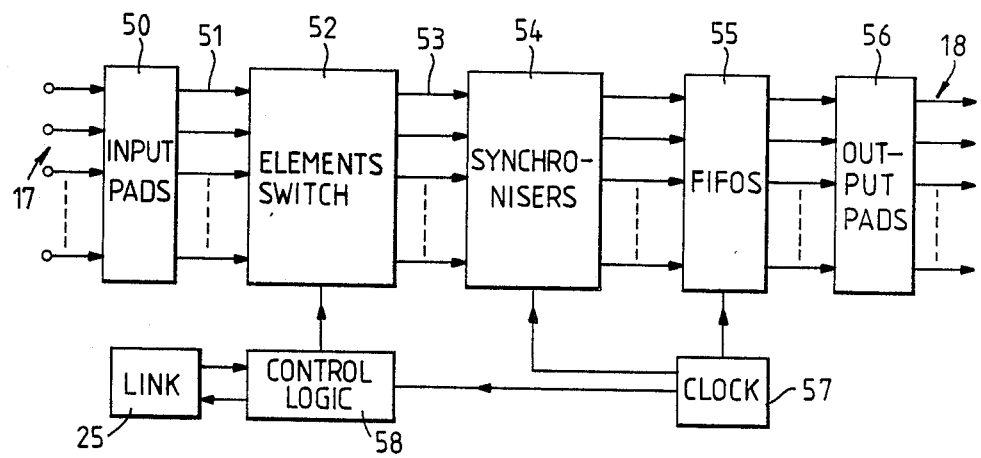
FIG. 4 illustrates in block diagram form one digital signal switch device in accordance with the invention.

The switch 11 is controlled by its own clock 57 as shown in FIG. 4 and the clock 57 will have the same frequency as the controlling clocks on both the outputting and inputting microcomputers or devices which are connected to the switch 11. It will be appreciated that although the clocks used on all the devices connected in the network as well as the clock on the switch 11 may have the same nominal frequency, there will of course be phase differences between these clocks and it is also impossible to obtain absolute uniformity of frequency so that no relative phase changes occur over prolonged periods of data transmission through the switch. For this reason the switch 11 is provided with the synchronizers 54 and buffers 55 so as to avoid problems of difference in phase between the clocks used and also minor differences in clock frequencies or frequency jitter. It also provides a way of generating bit packets at the output pads 56 which correspond to the bit packets which were input at the input pads 50 without any degradation of the bit pattern signal. In this way it is possible to use a succession of switches in series as shown in FIG. 3 so that there is no degradation of the signal clarity after passing through any number of switches. Each synchronizer 54 is of similar type to the synchronizer 72 shown in FIG. 9 of our U.S. patent application Ser. No. 756,992. The clock 57 in the present example is arranged to operate at five times the bit frequency of the bit pattern in the input and output packets. The synchronizer 54 is arranged to sample the signals output on line 53 from the AND gate 64 and this sampling is done at five times the bit frequency so as to detect the leading edge of a start bit of either a data packet or an acknowledge packet. Once the leading edge of the new packet has been detected, the synchronizer 54 provides an output signal on line 70 two clock pulses after detecting the leading edge. Successive signals are provided on line 70 after each five clock pulses so that the signal on line 70 is a synchronized timing signal indicating intervals when the signal on line 53 may be treated as valid. Data from the AND gate 64 is fed directly to the buffer 55 on line 71, and the buffer 55 is arranged to be loaded with each bit on line 71 at time of coincidence with timing signals on line 70.

After each packet has been loaded into the buffer 55 a reset signal is provided on line 72 to reset the synchronizer 54 so that it is ready to synchronize again with the start bit of a further signal packet. The buffer 55 is a first in first out buffer and the output is supplied on line 73 to the output pad 56.

Figure 7:
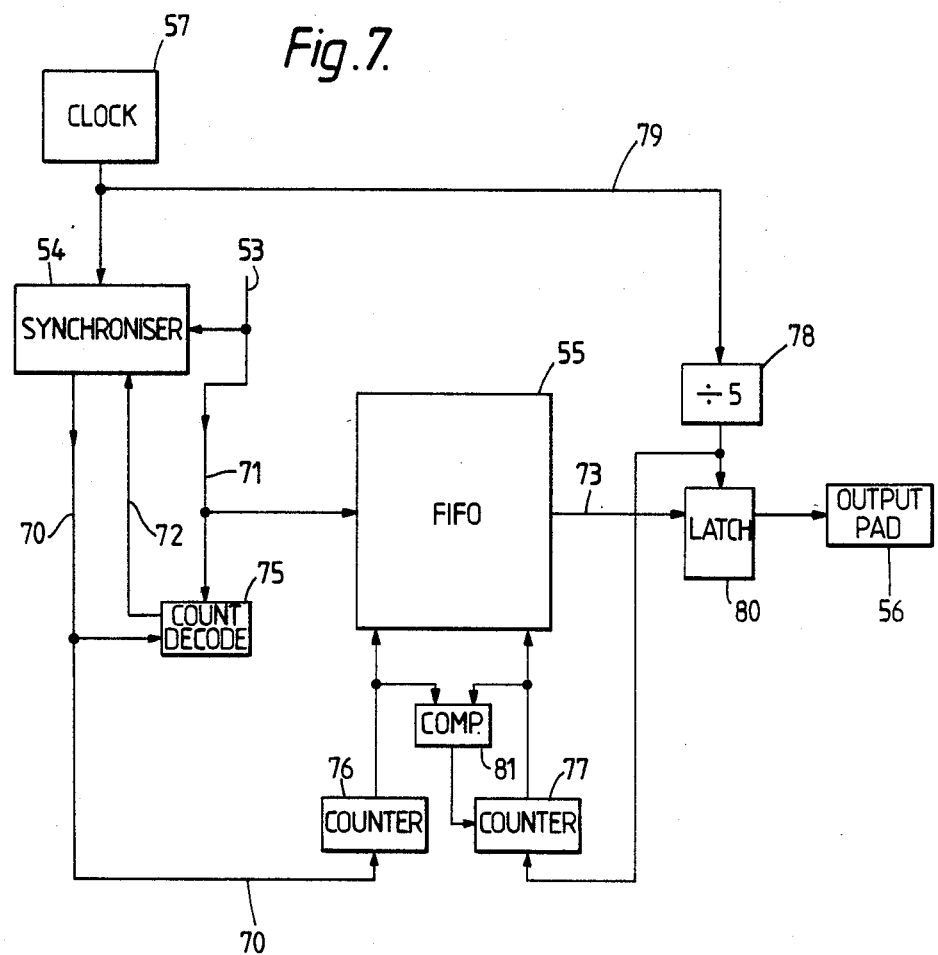

The operation of the buffer 55 will be explained more fully with reference to FIG. 7. Input data is supplied on line 53 to an input of the buffer 55 as well as to a bit counter and decoder 75. The counter and decoder 75 examines the bits arriving in each packet to determine whether or not the packet is a data packet or an acknowledgement packet. In the example given this is determined by examination of the second bit in each packet. If the second bit is a 1 then the packet will be a data packet requiring 8 further data bits. If the second bit of the packet is 0, then it is an acknowledgement packet requiring no further bits.

The counter and decoder 75 is arranged to provide a reset signal on line 72, and if the packet is decoded as a data packet then the reset signal will be provided after 11 bits (that is 2 start bits, 8 data bits and a final stop bit). However, if the packet is decoded as an acknowledgement packet then a reset signal will be provided on line 72 after 2 bits. This enables the synchroniser 54 to be resynchronised with each packet, as data may not necessarily be continuously supplied through the corresponding input, and in this way synchronization is effected with the beginning of each packet received. The buffer 55 is loaded with data from line 71 under the control of an input counter 76. This counter receives synchronized timing signals from the synchronizer 54 and loads successive bits of each packet into successive locations of the buffer in synchronization with the timing signals on line 70. Output data is generated by the buffer 55 on line 73 under the control of an output counter 77. The output counter 77 receives timing pulses from a divide by 5 unit 78 which receives clock pulses from clock 57 via line 79. The operations of both counters 76 and 77 are synchronous as they operate from the common clock 57. During input of a signal packet, the clock pulse on line 70 will have the same frequency as the clock pulses supplied to counter 77 although the phase of signals fed to the counters 76 and 77 will not necessarily be synchronized. The divide by 5 unit 78 also supplies timing pulses to a latch 80 leading to the output pad 56. The two counters 76 and 77 are coupled by a comparator 81 which will not allow counter 77 to advance if the count on counter 77 matches the count on the input counter 76. In this way it avoids the buffer attempting to output data which has not yet been input. Both counters 76 and 77 are cyclic counters counting from 0 up to the number of bits which may be held in the buffer 55.

In addition to regenerating the output bit packets so that they correspond to the input bit packets without any degradation, the provision of the buffer 55 allows for frequency jitter or small frequency differences which may arise after prolonged operation between different clocks which have nominally the same frequency. Any microcomputer or other device which is attempting to output data through the switch to an inputting microcomputer may find that the switch is transmitting data at a slightly slower rate than the outputting microcomputer is outputting its data. Due to the protocol used and described in the U.S. Patent Specifications referred to above, any outputting microcomputer or device having a suitable link interface can only output one data packet at a time until it has received an acknowledgement packet from the inputting device. This acknowledgement packet may be generated as soon as the beginning of a data packet is received or when the end of a data packet is received. If the acknowledgement packet is sent as soon as the start of the data packet is received, it is possible for an outputting device to send bit packets continuously. It is therefore necessary for the switch 11 to be able to hold, if necessary, sufficient data bits to accommodate a delay of one data packet, and one acknowledgement packet should the switch be lagging behind the outputting device sufficient to cause a lag corresponding to one whole data packet and an acknowledgement packet. It is also desirable to be able to accommodate in the switch a delay corresponding to a gap of 1 bit so as to delay the output of a further data packet while allowing the switch to catch up.

In the present example, the transmission of messages has two inherent delays in the protocol.

This is due to the time taken to recognize the start bit and then examine the middle of the subsequent bit to determine the type of packet. For the combination of a data packet and acknowledgement packet, this involves an inherent delay of 3 bits. The buffer in the switch is therefore chosen so that when the buffer is full it causes sufficient signal delay that data cannot be transferred continuously. This requires the ability to hold 11 bits in the buffer 55. It will be appreciated that the buffer in this example consists of a plurality of latches, or memory cells, selectable under the control of the counters.

The operation of the control logic 58 and serial link 25 will be described with reference to FIG. 6. The link 25 has the same structure and operation as that shown in FIG. 7 of our U.S. patent application Ser. No. 756,992 and the description will not be repeated here. In FIG. 6 the link 25 has an input data bus 100 which corresponds to the bus 97 shown in FIG. 7 of the above mentioned U.S. patent application. Similarly control signals 101 and 102 connected to the link 25 correspond to signals 98 and 99 in FIG. 7 of that U.S. patent application. In this particular example the link is used to input programming data for setting the configuration of the switch but it is not arranged to provide an output. For this reason no output bus is necessary corresponding to the output bus 95 shown in that FIG. 7 of the U.S. patent application. The signal line corresponding to line 96 in FIG. 7 of that U.S. patent application is grounded and is not specifically shown in the drawings of the present application. The bus 100 is connected to a command register 105 and optionally to a first register 106 and a second register 107. Loading of the registers 105, 106 and 107 is controlled by enable signals on lines 108, 109 and 110 respectively leading from bus control logic 111. The bus control logic also provides the connect-/disconnect signal 68 and reset signal 67 already described with reference to FIG. 5. The link 25 may receive programming commands from the microcomputer 12 and these commands may consist of 1, 2 or 3 bytes. This allows five different messages as follows:

|  | byte 1 | byte 2 | byte 3 |
| --- | --- | --- | --- |
| 1st message | 1 | input A | output B |
| 2nd message | 2 | link A | link B |
| 3rd message | 3 | output A |  |
| 4th message | 4 | link A | link B |
| 5th message | 5 |  |  |

The first message has the effect of connecting input A to output B. The second message has the effect of connecting the input of link A to the output of link B and and the output of link A to the input of link B. It will be understood that reference to link A refers to the pair of lines which form an input and an output of a particular link A such as link 20 on a microcomputer 13 or the like. Message No 3 has the effect of disconnecting output A. The fourth message has the effect of disconnecting the output of link A and the output of link B. The fifth message has the effect of disconnecting all outputs.

The operation of messages received by the link 25 will now be described. For the first message referred to above, the first byte representing 1 is loaded into the command register 105, and this causes the bus control logic 111 to load the two next bytes into the first register 106 and second register 107 respectively. The first register then holds data representing the selected input and the second register 107 holds data representing the selected output. The control logic 111 controls the multiplexors 112 and 113 so that the multiplexor 113 connects data from the register 106 onto the bus 65 thereby providing a signal representing the input to be selected. The multiplexor 112 selects data from the second register 107 which is decoded by a decoder 114 to provide the appropriate enable signal 66. The bus control logic 111 also provides the appropriate connect signal 68 so that the selected multiplexor 60 connects the required input signal on the bus 51 to its associated AND gate 64 which transmits the signal as the appropriate connect latch 63 has been set by the connect signal 68 and enable signal 66.

On receipt of a message of the second type referred to above, the operation is as already described for connecting an input determined by the first register 106 to an output selected by the second register 107. The bus control logic 111 then operates the multiplexors 113 and 112 so as to interchange the data. The data held in the second register is then used by the multiplexor 113 to select an input on bus 65 and the data held in the first register 106 is used by the multiplexor 112 to select an appropriate enable signal 66. The operation is otherwise as previously described.

On receipt of a message of the third type referred to above, the command register 105 holds the value 3, and this causes the bus control logic 111 to load a further byte into the first register 106 so as to identify which output 56 of the switch is to be disconnected. The control logic 112 causes the multiplexor 112 to load data from the first register 106 into the decoder 114 so that an enable signal is provided on one of the lines 66 corresponding to the selected output 56. The bus control logic 112 also provides a disconnect signal value on line 68 so that the connect latch 63 associated with the selected output pad 56 receives an enable signal 66 as well as a disconnect signal 68. This switches the latch 63 so that the associated AND gate 64 now provides no connection between the input bus 51 and the selected output pad 56.

On receipt of a message of the fourth type, the command register 105 is loaded with the value 4. This causes the bus control logic 112 to load into registers 106 and 107 second and third bytes received by the link 25 representing respectively the outputs used by link A and link B respectively. The bus control logic 112 then causes the multiplexor 112 to decode the contents of the first register 106 in order to disconnect the output of link A as has previously been described with reference to operation of a message of the third type. The bus control logic 111 then causes the multiplexor 112 to use the contents of the second register 107 to disconnect the output of link B in a similar way.

On receipt of a message of the fifth type, the command register 105 is loaded with the first byte received by the link 25 and this represents numeral 5. In response to this the bus control logic 11 causes a reset signal to be output on line 67 and this is fed to each of the connect latches 63 of all the outputs in the switch. This resets them to a condition in which no signal is fed to the AND gates 64 so that all output pads 56 are disconnected.

In the above examples, the clock 57 may comprise a phase locked loop circuit of the type comprising a control loop circuit arranged upon receipt of a clock signal to produce a timing signal whose frequency is a multiple of that of said clock signal, the circuit being formed on a single integrated circuit chip. The loop circuit may include a voltage controlled oscillator. One or more current sources may be provided for generating a voltage signal for controlling said oscillator. The clocks 57 may be of the type described in our published European Patent Specification No. 0144158 the disclosure of which is herein incorporated by cross reference.

It will be understood that a network of the type shown in FIG. 1 may be used with a plurality of separate clocks on each of the microcomputers or other devices as well as a separate clock on the switch 11 provided these clocks have the same nomimal frequency. It is not necessary to distribute a common clock throughout the entire network. The use of a technique which regenerates bit patterns passed through the switch, 11 avoids any signal degradation by the switch and the use of the buffers 55 will accommodate frequency jitter of clocks used for each switch and it can also accommodate phase differences or accumulated differences in clock signals arising from small frequency deviation between a number of clocks used in the network and the switch 11.

The switch 11 may be formed on a single integrated circuit chip.

The invention is not limited to the details of the foregoing examples.

We claim:

1. A digital signal switch for effecting a plurality of selectable interconnections between devices which communicate with each other by serial bit packets of two types, a first type being a data packet of a first format commencing with a start bit and a second type being an acknowledgement packet of a second format commencing with a start bit, said switch having a plurality of inputs, a plurality of outputs, and connecting circuitry for selectively interconnecting said inputs and outputs, said connecting circuitry having:
   (a) a start bit detector for detecting a start bit of a serial bit packet which is inputted to the switch,
   (b) clock circuitry providing timing signals,
   (c) a buffer for holding a plurality of bits,
   (d) input control circuitry coupled to said buffer for loading progressively into said buffer a succession of bits corresponding to a serial bit packet which is inputted to the switch, and
   (e) output control circuitry coupled to said buffer for regenerating a succession of bits to form an output from said buffer corresponding to said succession of bits loaded into the buffer, said output control circuitry being operable under control of said clock circuitry to output bits progressively from the buffer as said input control circuitry loads bits progressively into said buffer.

2. A switch according to claim 1 in which said buffer has a bit capacity to hold at least one said bit packet of said first type, whereby small differences in bit frequency between said bit packets which are inputted and bit packets which are outputted may be accommodated without loss of data in the switch.

3. A switch according to claim 2 in which said buffer means has a bit capacity of at least ten bits.

4. A switch according to claim 2 in which said connecting circuitry further comprises a plurality of signal paths, each signal path making a connection between a respective one of said plurality of inputs and a respective one of said plurality of outputs, each path having a selector and a latch means to determine which of said inputs and which of said outputs is to be connected as an input/output pair through that selector.

5. A switch according to claim 4 in which each of said plurality of signal paths further comprises synchronizing circuitry coupled for sampling said inputs to detect a leading edge of a start bit of a said serial bit packet and supplying a synchronized signal after a controlled time interval from detection of said leading edge in order to provide a true indication of bits in an inputted serial bit packet despite any phase difference between said clock circuitry and input of the said serial bit.

6. A switch according to claim 5 in which said buffer is a first in first out buffer having an input counter for clocking data into the buffer and an output counter for clocking data out of said buffer, said input counter being coupled to receive clock signals from said synchronizing circuitry.

7. A switch according to claim 5 wherein said start bit detector includes a decoder coupled in said connecting circuitry to determine whether each serial bit packet is of said first or said second type, said decoder being coupled to receive said timing signals and to said synchronizing circuitry to reset said synchronizing circuitry after a number of said timing signals depending on which type of serial bit packet is detected, and thereby detect a new leading edge of the start bit of a next said serial packet.

8. A switch according to claim 1 in which said buffer is a first in first out buffer having an input counter for clocking data into the buffer and an output counter for clocking data out of said buffer.

9. A switch according to claim 1 further including a communication interface to achieve communication between said switch and a controlling device, said communication interface being connected to said connecting circuitry in order to set a desired configuration for the switch interconnections.

10. A switch according to claim 9 in which said communication interface comprises an output channel for outputting data and an input channel for receiving data,
   the output channel comprising (a) an output terminal for connection to a first, external, unidirectional communication line so as to transmit data bits serially along said first communication line, and
   (b) a packet generator coupled to generate and supply to said output terminal serial data packets of the first format for conveying data and said acknowledgement packets of the second format to indicate receipt of a data packet,
   said input channel comprising (c) an input terminal for connection to a second, external, unidirectional communication line so as to receive data bits serially along said second communication line, and (d) a packet decoder for receiving said serial bit packets from said input terminal and detecting whether the packet has said first format or said second format;
   said interface including control circuitry connected to said packet generator and to said packet decoder and responsive to the output of a packet by the output channel or receipt of a packet by the input channel to cause the packet generator to output an acknowledgement packet in response to receipt of a said data packet by said input channel and after output of a said data packet to prevent output of a further said data packet until said input channel has received said acknowledgement packet.

11. A network of interconnected digital devices including a plurality of microcomputers, said device being interconnected by at least one switch device and configured to communicate with each other by serial bit packets of two types, a first type being a data packet having a first format commencing with a start bit, and a second type being an acknowledgement packet having a second format commencing with a start bit, said switch having a plurality of inputs, a plurality of outputs, and connecting circuitry for selectively interconnecting said inputs and outputs, said connecting circuitry having:

(a) a start bit detector for detecting a start bit of a serial bit packet which is inputted to the switch,
(b) clock circuitry providing timing signals,
(c) a buffer for holding a plurality of bits,
(d) input control circuitry coupled to said buffer for loading progressively into said buffer a succession of bits corresponding to a serial bit packet which is inputted to the switch, and
(e) output control circuitry coupled to said buffer for regenerating a succession of bits to form an output from said buffer corresponding to said succession of bits loaded into the buffer, said output control circuitry being operable under control of said clock circuitry to output bits progressively from the buffer as said input control circuitry loads bits progressively into said buffer.

12. A network according to claim 11 in which each said digital device is connected to a said switch device by a communication interface which comprises an output channel for outputting data and an input channel for receiving data, said output channel comprising (a) an output terminal for connection to a first, external, unidirectional communication line so as to transmit data bits serially along said first communication line, and (b) a packet generator coupled to generate and supply to said output terminal a succession of serial bit packets having said first and second formats, said input channel comprising (c) an input terminal for connection to a second, external, unidirectional communication line so as to receive data bits serially along said second communication line, and (d) a packet decoder for receiving said serial bit packets from said input terminal and detecting whether the packet has said first format or said second format;

said interface including control circuitry connected to said packet generator and said packet decoder and responsive to the output of a packet by said output channel or receipt of a packet by said input channel to cause the packet generator to output an acknowledgement packet in response to receipt of a said data packet by said input channel and after output of a data packet to prevent output of a further said data packet until said input channel has received a said acknowledgement packet.

13. A network according to claim 11 in which each said buffer has a bit capacity to hold at least one serial bit packet of said first type.

14. A network according to claim 13 wherein said input control circuitry includes an input counter for clocking data into said buffer, and wherein said output control circuitry includes an output counter for clocking data out of said buffer progressively as data is clocked into said buffer.

15. A network of interconnected digital devices as claimed in claim 11 in which the configuration of the network is determined by one or more switch devices as claimed in claim 18.

16. A method of configuring interconnection of a plurality of digital devices including a plurality of microcomputers in a network, which method comprises the steps of:

connecting a communication interface on each of said digital device to a switch;
setting a selected pattern of switch connections between a plurality of inputs and outputs on said switch;
receiving messages at one or more inputs of said switch,
each message comprising a serial bit packet of two alternative types, a first type being a data packet having a first format commencing with a start bit and a second type being an acknowledgement having a second format commencing with a start bit;
detecting a start bit of a said serial bit packet which is inputted to the switch;
loading progressively into buffer circuitry a succession of bits corresponding to a said serial bit packet which is inputted to said switch;
and forming an output from said buffer circuitry by regenerating a succession of bits corresponding to said bits loaded into said buffer circuitry, said formation of an output from the buffer circuitry being controlled by clock pulses to output bits progressively as said succession of bits is loaded into said buffer circuitry.

17. A method according to claim 16 further comprising the steps of inputting bits in each said serial bit packet at a first frequency, decoding each said serial bit packet to determine whether the packet is of said first or second type, and sampling said messages at a second frequency higher than said first frequency in order to detect a leading edge of a start bit of a packet and supplying a synchronized signal after a controlled time interval from detection of said leading edge in order to provide an indication of a bit pattern in an input packet.

18. A method according to claim 16 further comprising the steps of setting a plurality of interconnections within said switch by communication of signals from a first communication interface on a microcomputer with a connected second communication interface on said switch.

19. A method according to claim 16 wherein a succession of said serial data packets of said first type are inputted to said switch, each said serial data packet being inputted from a said digital device only after said digital device has received a serial data packet of said second type to acknowledge a preceding serial data packet of said first type, said buffer circuitry being arranged to hold a number of data packets corresponding to a serial data packet of said first type thereby to accommodate any small difference in frequency between input and output of data bits from said buffer circuitry.

* * * * *